US011301688B2

(12) United States Patent
Ahmed et al.

(10) Patent No.: US 11,301,688 B2
(45) Date of Patent: *Apr. 12, 2022

(54) CLASSIFYING A MATERIAL INSIDE A COMPARTMENT AT SECURITY CHECKPOINTS

(71) Applicant: INTERNATIONAL BUSINESS MACHINES CORPORATION, Armonk, NY (US)

(72) Inventors: Mohamed Nooman Ahmed, Leesburg, VA (US); Samuel H. Woo, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 188 days.

This patent is subject to a terminal disclaimer.

(21) Appl. No.: 16/441,308

(22) Filed: Jun. 14, 2019

(65) Prior Publication Data

US 2020/0394417 A1  Dec. 17, 2020

(51) Int. Cl.
*G06K 9/00* (2006.01)
*G06F 16/51* (2019.01)
(Continued)

(52) U.S. Cl.
CPC ......... *G06K 9/00771* (2013.01); *G06F 16/51* (2019.01); *G06F 16/5854* (2019.01);
(Continued)

(58) Field of Classification Search
CPC ............ G06K 9/00771; G06K 9/6262; G06K 9/6268; G06K 9/6271; G06K 2209/09;
(Continued)

(56) References Cited

U.S. PATENT DOCUMENTS 6,026,171 A * 2/2000 Hiraoglu ............... G01T 1/2985
250/363.04
9,268,058 B2  2/2016 Peschmann
(Continued)

FOREIGN PATENT DOCUMENTS

CN  107607562  6/2020
KR  102063859  2/2020

OTHER PUBLICATIONS

Prasoon A., Petersen K., Igel C., Lauze F., Dam E., Nielsen M. (2013) Deep Feature Learning for Knee Cartilage Segmentation Using a Triplanar Convolutional Neural Network. In: Mori K., Sakuma I., Sato Y., Barillot C., Navab N. (eds) Medical Image Computing and Computer-Assisted Intervention (Year: 2013).*
(Continued)

*Primary Examiner* — Michael J Vanchy, Jr.
(74) *Attorney, Agent, or Firm* — Schmeiser, Olsen & Watts, LLP; Christopher Pignato

(57) ABSTRACT

A system and method for automatically detecting prohibited materials in a compartment at a security checkpoint includes receiving a three-dimensional representation of a compartment from an imaging device connected to the computing system, and classifying each voxel of the three-dimensional representation using a trained neural network to determine whether any voxel classifications of the three-dimensional representation correspond to a voxel classification of a prohibited material.

12 Claims, 11 Drawing Sheets

(51) Int. Cl.
  *G06F 16/583* (2019.01)
  *G06N 3/08* (2006.01)
  *G06K 9/62* (2006.01)
(52) U.S. Cl.
  CPC ......... *G06K 9/6262* (2013.01); *G06K 9/6268* (2013.01); *G06N 3/08* (2013.01)
(58) Field of Classification Search
  CPC ............. G06K 9/00201; G06K 9/3241; G06K 9/6231; G06K 9/6257; G06K 9/628; G06K 9/00208; G06K 9/00624; G06K 9/4628; G06K 9/6232; G06K 9/6267; G06K 9/6277; G06K 9/629; G06K 19/0723; G06K 19/07749; G06K 2209/05; G06K 2209/051; G06K 7/10366; G06K 9/2054; G06K 9/3233; G06K 9/46; G06K 9/4604; G06K 9/4647; G06K 9/627; G06K 9/6292; G06K 9/6296; G06F 16/5854; G06F 16/51; G06N 3/08; G06N 20/00; G06N 3/0454; G06N 23/046; G06N 3/04; G06N 3/02; G06N 7/005; G06N 3/082; G06N 3/084; G06N 3/088; G01V 5/0008; G01V 5/0083; G01V 5/0016; G01V 5/005; G06T 2207/10008; G06T 2207/20081; G06T 2207/20084; G06T 7/0002; G06T 2207/10116; G06T 2207/10081; G01N 23/04; G01N 2223/401; G01N 2223/639; G01N 23/046
  See application file for complete search history.

(56) References Cited

U.S. PATENT DOCUMENTS

| | | | |
|---|---|---|---|
| 9,996,890 B1* | 6/2018 | Cinnamon | G06K 9/627 |
| 10,013,750 B2 | 7/2018 | Zhang et al. | |
| 10,014,076 B1 | 7/2018 | LaBorde | |
| 11,093,803 B2 | 4/2021 | Ahmed | |
| 11,106,930 B2 | 8/2021 | Ahmed | |
| 2009/0175411 A1* | 7/2009 | Gudmundson | G06K 9/3241 378/57 |
| 2017/0242148 A1 | 8/2017 | Yu et al. | |
| 2017/0365118 A1 | 12/2017 | Nurbegovic | |
| 2019/0209116 A1 | 7/2019 | Ahmed | |
| 2019/0244346 A1* | 8/2019 | Schafer | G06T 7/187 |
| 2020/0103548 A1 | 4/2020 | Yu | |
| 2020/0193666 A1 | 6/2020 | Cinnamon | |
| 2020/0320685 A1* | 10/2020 | Anssari Moin | G06T 11/008 |
| 2020/0394417 A1 | 12/2020 | Ahmed | |
| 2020/0394430 A1 | 12/2020 | Ahmed | |
| 2020/0394442 A1 | 12/2020 | Ahmed | |

OTHER PUBLICATIONS

U.S. Appl. No. 16/441,334, filed Jun. 14, 2019, Conf. No. 1495.
U.S. Appl. No. 16/441,270, filed Jun. 14, 2019, Conf. No. 9203.
Anomalous Object detection in mm-wave imagery, IP.com No. IPCOM000200693D, IP.com Electronic Publication Date: Oct. 25, 2010, copyright: HRL Laboratories, LLC, 6 pages.
Method and system for airport baggage security checking with holographic object navigation, Authors: et. al.: Disclosec Anonymously, IP.com No. IPCOM000246751D, IP.com Electronic Publication Date: Jun. 29, 2016, 3 pages.
Method and System for Interpreting Scanned Security Images using Cognitive Solutions, Authors: et. al.: Disclosed Anonymously, IP.com No. IPCOM000255971D, IP.com Electronic Publication Date: Oct. 26, 2018, 3 pages.
Collaborative Mobile Device Enabled In-Baggage Suspicious Object Detection, Authors: et. al.: Disclosed Anonymously, IP.com No. IPCOM000258674D, IP.com Electronic Publication Date: Jun. 3, 2019, 7 pages.
Flitton et al., Object Classification in 3D Baggage Security Computed Tomography Imagery using Visual Codebooks, Jan. 2015, 26 pages.
Mouton et al., A review of automated image understanding within 3D baggage computed tomography security screening, Article in Journal of X-Ray Science and Technology, Sep. 2015, 50 pages.
Allan Zelener, Survey of Object Classification in 3D Range Scans, 2017, 32 pages.
Final Amendment dated Apr. 6, 2021, U.S. Appl. No. 16/441,334.
Notice of Allowance dated Apr. 19, 2021, U.S. Appl. No. 16/441,334.
Notice of Allowance dated Apr. 16, 2021, U.S. Appl. No. 16/441,270.
Amendment dated Apr. 6, 2021, U.S. Appl. No. 16/441,270.
Zanuttigh et al., Deep Learning for 3D Shape Classification From Multiple Depth Maps, Deparlment of Information Engineering, University of Padova, Italy, 2017, https://ieeexplore.ieee.org/document/8296956, 5 pages.
Bu et al., 3D shape recognition and retrieval based on multi-modality deep learning, vol. 259, Oct. 11, 2017, Retrieved from Internet on Jan. 5, 2022: https://www.sciencedirect.com/science/article/abs/pii/S0925231217302576, 3 pages.
Le et al., PointGrid: A Deep Network for 3D Shape Understanding, University of Missouri—Columbia, 2018, https://openaccess.thecvf.com/content_cvpr_2018/papers/Le_PointGrid_A_Deep_CVPR_2018_paper.pdf, 11 pages.
Wu et al., 3D ShapeNets: A Deep Representation for Volumetric Shapes, Cornell University, https://arxiv.org/abs/1406.5670, Submitted on Jun. 22, 2014, last revised Apr. 15, 2015, 9 pages.
Qi et al., PointNet: Deep Learning on Point Sets for 3D Classification and Segmentation, Cornell University, https://arxiv.org/abs/1612.00593, Submitted on Dec. 2, 2016, last revised Apr. 10, 2017, 9 pages.
Kalogerakis et al., 3D Shape Segmentation with Projective Convolutional Networks, Proceedings of the IEEE Computer Vision and Pattern Recognition (CVPR) 2017, https://people.cs.umass.edu/~kalo/papers/shapepfcn/ShapePFCN.pdf, 11 pages.
Cao et al.. Learning to Reconstruct High-quality 3D Shapes with Cascaded Fully Convolutional Networks, https://ppenaccess.thecvf.com/content_ECCV_2018/papers/Yan-Pei_Cao_Learning_to_Reconstruct_ECCV_2018_paper.pdf, 18 pages.
Lippert et al., Exploring DeepMedic for the purpose of segmenting white matter hyperintensity lesions, Feb. 27, 2018, https://www.spiedigitallibrary.org/conference-proceedings-of-spie/10575/105752F/Exploring-DeepMedic-for-the-purpose-of-segmenting-white-matter-hyperintensity/10.1117/12.2292809.short, 9 pages.
Minto et al., Deep Learning for 3D Shape Classification Based on Volumetric Density and Surface Approximation Clues, Published Sep. 1, 2017 Computer Science 2017 IEEE International Conference on Image Processing, https://lttm.dei.unipd.it/nuovo/Papers/18_VISAPP_3d_multi_classification.pdf, 8 pages.
Kao et al., Brain Tumor Segmentation and Tractographic Feature Extraction from Structural MR Images for Overall Survival Prediction, https://arxiv.org/pdf/1807.07716.pdf, arXiv:1807.07716v3 [cs.CV] Nov. 12, 2018, 14 pages.
Oktay et al., Attention U-Net: Learning Where to Look for the Pancreas, https://arxiv.org/pdf/1804.03999.pdf, arXiv:1804 03999v3 [cs.CV] May 20, 2018, 10 pages.
Cicek et al., 3D U-Net: Learning Dense Volumetric Segmentation from Sparse Annotation, https://arxiv.org/abs/1606.06650.pdf, arXiv:1606.06650v1 [cs.CV] Jun. 21, 2016, 8 pages.
Roth et al., Deep learning and its application to medical image segmentation, https://arxiv.org/pdf/1803.08691.pdf, arXiv:1803.08691v1 [cs.CV] Mar. 23, 2018, 6 pages.
Heimann et al., Statistical shape models for 3D medical image segmentation: A review, Medical Image Analysis vol. 13, Issue 4, Aug. 2009, pp. 543-563, https://www.sciencedirect.com/science/article/abs/pii/S1361841509000425, 11 pages.
Socher et al., Convolutional-Recursive Deep Learning for 3D Object Classification, https://proceedings.neurips.cc/?aper/2012/file/3eae62bba9ddf64f69d49dc48e2dd214-Paper.pdf, Computer Science Department, Stanford University, Stanford, CA 94305, USA, 9 pages.
Isin, et al., Review of MRI-based Brain Tumor Image Segmentation Using Deep Learning Methods, Procedia Computer Science vol.

(56) References Cited

OTHER PUBLICATIONS 102, 2016, pp. 317-324, https://www.sciencedirect.com/science/article/pii/S187705091632587X, 8 pages.
Bui et al., 3D Densely Convolutional Networks for Volumetric Segmentation, arXiv:1709.03199v2 [cs.CV] Sep. 13, 2017, https://arxiv.org/pdf/1709.03199.pdf, 7 pages.
Bernal et al., Quantitative analysis of patch-based fully convolutional neural networks for tissue segmentation on brain magnetic resonance imaging, inarXiv: 1801 06457v2 [cs.CV] Feb. 19, 2018, https://arxiv.org/pdf/1801 06457.pdf, 10 pages.
Suk et al., Deep ensemble learning of sparse regression models for brain disease diagnosis, Medical Image Analysis vol. 37, Apr. 2017, pp. 101-113, Retrieved from Internet on Jan. 11, 2022, https://www.sciencedirect.com/science/article/abs/pii/S1361841517300166?via%3Dihub, 2 pages.
Szegedy et al., Going deeper with convolutions, arXiv:1409.4842v1 [cs.CV] Sep. 17, 2014, https://arxiv.org/odf/1409.4842.pdf, 12 pages.
Sarkar et al., Learning 3D Shapes as Multi-Layered Height-maps using 2D Convolutional Networks, arXiv:1807 08485V2 [cs.CV] Jul. 26, 2018, https://arxiv.org/pdf/1807.08485.pdf, 23 pages.
Roth et al., An application of cascaded 3D fully convolutional networks for medical image segmentation, arXiv: 1803 05431 v2 [cs.CV] Mar. 20, 2018, https://arxiv.org/pdf/1803.05431.pdf, 21 pages.
Litjens, et al., A Survey on Deep Learning in Medical Image Analysis, arXiv: 1702.05747v2 [cs.CV] Jun. 4, 2017, https://arxiv.org/pdf/1702.05747.pdf, 38 pages.
Krizhevsky et al., ImageNet Classification with Deep Convolutional Neural Networks, https://proceedings.neurips.cc/paper/2012/file/c399862d3b9d6b76c8436e924a68c45b-Paper.pdf, 9 pages.
Ronneberger et al., U-Net: Convolutional Networks for Biomedical Image Segmentation, arXiv: 1505.04597v1 [cs.CV] May 18, 2015, https://arxiv.org/pdf/1505.04597.pdf, 8 pages.
He et al., Deep Residual Learning for Image Recognition, arXiv:1512.03385v1 [cs.CV] Dec. 10, 2015, https://arxiv.org/odf/1512.03385.pdf, 12 pages.
Zheng et al., 3D Deep Learning for Efficient and Robust Landmark Detection in Volumetric Data, Conference paper First Online: Nov. 18, 2015, https://link.springer.com/chapter/10.1007/978-3-319-24553-9_69, 4 pages.
Bakator et al., Deep Learning and Medical Diagnosis: A Review of Literature, Received: Jun. 20, 2018; Accepted Aug. 14, 2018; Published: Aug. 17, 2018, Multimodal Technologies and Interact. 2018, 2, 47;doi:10.3390/mti2030047, https://www.mdpi.com/2414-4088/Feb. 3, 47/htm, 12 pages.
Huang et al., Densely Connected Convolutional Networks, arXiv:1608.06993v5 [cs.CV] Jan. 28, 2018, https://arxiv.org/pdf/1608.06993.pdf, 9 pages.
Kanezaki et al., RotationNet: Joint Object Categorization and Pose Estimation Using Multiviews from Unsupervised Viewpoints, arXiv:1603.06208v4 [cs.CV] Mar. 23, 2018, https://arxiv.org/pdf/1603.06208.pdf, 24 pages.
Brock et al., Generative and Discriminative Voxel Modeling with Convolutional Neural Networks, arXiv:1608.04236v2 [cs.CV] Aug. 16, 2016, https://arxiv.org/pdf/1608.04236.pdf, 9 pages.
Garcia-Garcia et al., A Review on Deep Learning Techniques Applied to Semantic Segmentation, arXiv:1704 06857V1 [cs.CV] Apr. 22, 2017, https://arxiv.org/pdf/1704.06857.pdf, 23 pages.
Kamnitsas et al., Efficient Multi-Scale 3D Cnn with fully connected CRF for Accurate Brain Lesion Segmentation, arXiv:1603 05959v3 [cs.CV] Jan. 8, 2017, https://arxiv.org/pdf/1603.05959.pdf, 49 pages.
Guo et al., Deep LOGISMOS: Deep Learning Graph-based 3D Segmentation of Pancreatic Tumors on CT scans, arXiv:1801.08599v1 [cs.CV] Jan. 25, 2018, https://arxiv.org/pdf/1801.08599.pdf, 4 pages.
He et al., Mask R-CNN, arXiv:1703.06870v3 [cs.CV] Jan. 24, 2018, https://arxiv.org/pdf/1703.06870.pdf, 12 pages.
Menegola et al., Towards Automated Melanoma Screening: Exploring Transfer Learning Schemes, arXiv:1609 01228v1 [cs.CV] Sep. 5, 2016, https://arxiv.org/pdf/1609.01228 pdf, 4 pages.
U.S. Appl. No. 17/456,667, filed Nov. 29, 2021.
Dolz et al., HyperDense-Net: A hyper-densly connected CNN for multi-modal image segmentations, arXiv: 1804.02967v2 [cs CV] Mar. 2, 2019, https://arxiv.org/abs/1804.02967v2,13 pages.
Mouton, A. et al., A review of automated image understanding within 3D baggage computed tomography security screening, Article in Journal of X-Ray Science and Technology, Sep. 2015, 50 pages.
Q. Wang et al., "Multi-Class 3D Object Detection Within Volumetric 3D Computed Tomography Baggage Security Screening Imagery," [Submitted on Aug. 3, 2020], https://arxiv.org/abs/2008.01218.

* cited by examiner

CLASSIFYING A MATERIAL INSIDE A COMPARTMENT AT SECURITY CHECKPOINTS

STATEMENT REGARDING FEDERALLY SPONSORED RESEARCH OR DEVELOPMENT

This invention was made with government support under contract number HSTS04-17-C-CT7239 awarded by the Transportation Security Administration. The government has certain rights to this invention.

TECHNICAL FIELD

The present invention relates to systems and methods for screening compartments for prohibited objects, and more specifically the embodiments of a classification system for automatically detecting and classifying a material of an object inside a compartment.

BACKGROUND

Security checkpoints for screening compartments, such as luggage, backpacks, and suitcases are located at almost all transportation hubs. The screening process must be thorough yet also allow for a high volume of travelers to pass through the security checkpoint without sacrificing a quality of the screening process.

SUMMARY

An embodiment of the present invention relates to a method, and associated computer system and computer program product for automatically detecting prohibited materials in a compartment at a security checkpoint. A processor of a computing system receives a three-dimensional representation of a compartment from an imaging device connected to the computing system, and classifies each voxel of the three-dimensional representation using a trained neural network to determine whether any voxel classifications of the three-dimensional representation correspond to a voxel classification of a prohibited material.

DETAILED DESCRIPTION

In brief overview, security checkpoint locations at transportation hubs are designed to screen for prohibited items, such as explosives, sharps, weapons, and the like. To be allowed beyond a security checkpoint, travelers must allow security officials to scan or otherwise examine personal items, carryon bags, and other luggage. X-ray based technologies have been used for this purpose at security checkpoints for several decades. Items of interest, such as prohibited items, can be difficult to detect within this environment due to a range of orientation, clutter, and density confusion in a traditional two-dimensional (2D) X-ray projection. Specifically, the problem of objects occluding each other is a limitation of 2D X-ray scanners, which makes detection (automatically or by human operators) particularly challenging. For example, x-ray scanners take two images of an inside of a bag, which are displayed on a monitor for a security officer to inspect and visually determine whether the bag contains any prohibited items. X-ray technology at security checkpoints is limited because x-ray cannot penetrate certain objects that are often carried by travelers; some objects can obscure other objects.

To improve detection and passenger experience, embodiments of the present invention utilizes Computed Tomography (CT) technology instead of x-ray technology. CT technology can image a bag as a series of images packed together to form a three-dimensional rendering that can be viewed at multiple angles. Computer algorithms analyze the three-dimensional volume of data to automatically classify a bag has having or not having a prohibited item. Thus, instead of the security officer manually inspecting images on a monitor, which takes time and with varied results based on an experience level of the security officer, embodiments of the present invention automatically detect a presence of a prohibited material and classifies the material as a threat or no threat. Many prohibited materials can take many different shapes so classifying prohibited objects by known shape can result in a missed detection of a prohibited material. For example, prohibited materials may be a sheet, a liquid, or a powder, which can take the shape of its container. Confident and automatic detection of materials within a traveler's bag at a security checkpoint saves time for the traveler while at the same time increasing the quality of the screening process.

Figure 1:
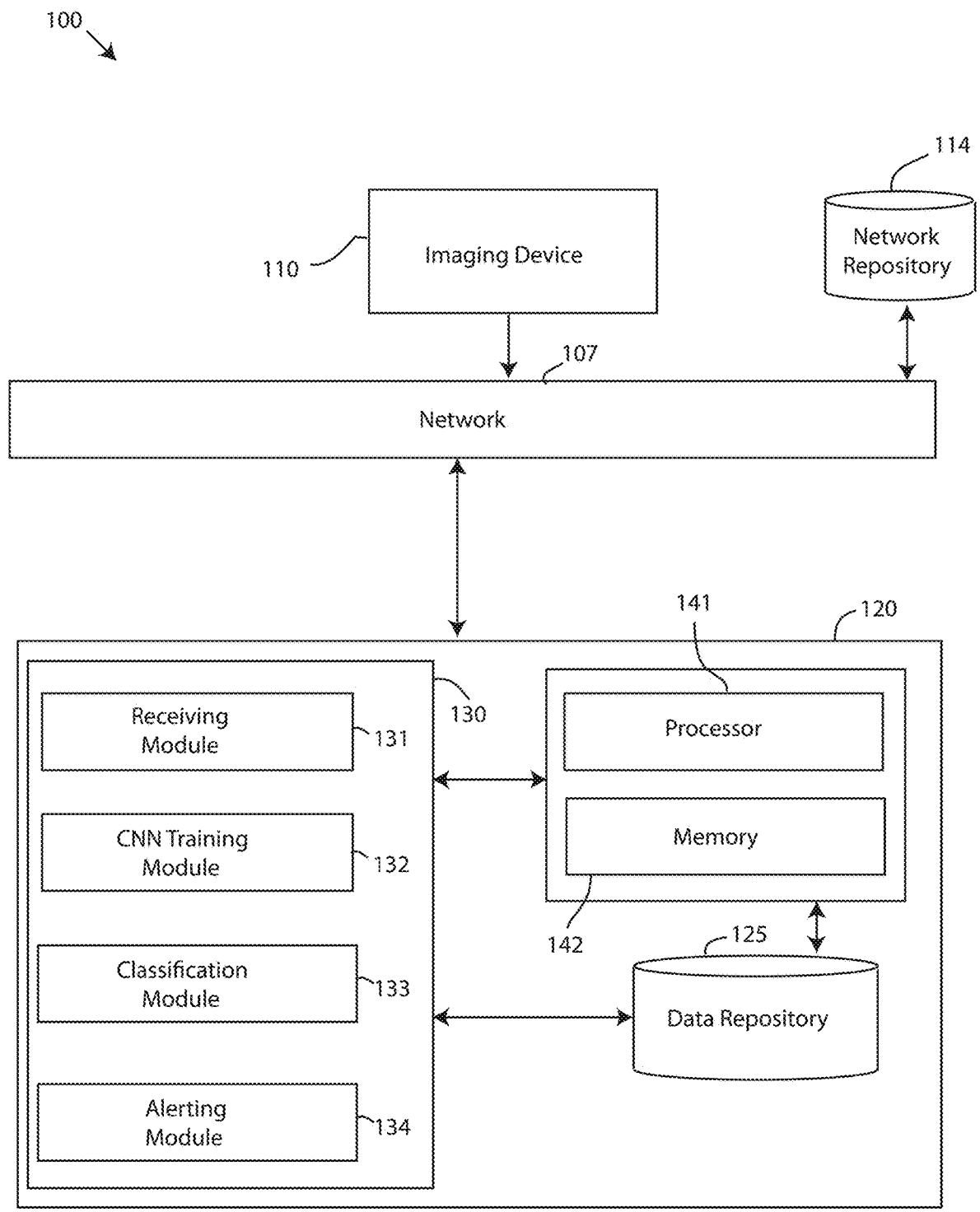
FIG. 1 depicts a block diagram of a classification system, in accordance with embodiments of the present invention.

Referring to the drawings, FIG. 1 depicts a block diagram of a classification system 100, in accordance with embodiments of the present invention. The classification system 100 is a system for automatically detecting prohibited materials in a compartment at a security checkpoint. The classification system 100 may be useful for screening procedures at airport security checkpoints to quickly and confidently identify whether a bag contains a prohibited material. Embodiments of the classification system 100 may be alternatively referred to a screening system, a luggage classification system, a security system, and the like.

The classification system 100 includes a computing system 120. Embodiments of the computing system 120 include a computer system, a computer, a server, one or more servers, a backend computing system, and the like.

Furthermore, the classification system 100 includes an imaging device 110 that is communicatively coupled to the computing system 120 over a network 107. For instance, information/data is transmitted to and/or received from the imaging device 110 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In alternative embodiment, the imaging device 110 has a wired connection to the computing system 120 via one or more data bus lines. The data output by the imaging device 110 is transmitted to the computing system 120 by connecting the imaging device 110 to the computing system 120 via data bus lines to an I/O interface. An interface refers to any communication process performed between the computer system 120 and the environment outside of the computer system 120, for example, the imaging device 110. Input to the computing system 120 refers to the signals or instructions sent to the computing system 120, for example the 3D volume data produced by the imaging device 110, while output may refer to the signals sent out from the computer system 120 to the imaging device 110.

In an exemplary embodiment, the network 107 further comprises, in addition to the computing system 120, a connection to one or more network-accessible knowledge bases 114, which are network repositories containing information relating to security policies, items permitted and not permitted, etc., network repositories or other systems connected to the network 107 that are considered nodes of the network 107. In an embodiment where the computing system 120 or network repositories allocate resources to be used by the other nodes of the network 107, the computing system 120 and network repository 114 is referred to as servers.

The network-accessible knowledge bases 114 is a data collection area on the network 107 which backs up and save all the data transmitted back and forth between the nodes of the network 107. For example, the network repository is a data center saving and cataloging the to security policies, items permitted and not permitted, etc., and the like, to generate both historical and predictive reports regarding a particular screening technique. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The imaging device 110 is a CT imaging device capable of scanning compartments, such as a bags, briefcases, suitcases, purses, computing devices, luggage, carryon bags, and the like. The imaging device 110 provides volumetric imagery that produce a three-dimensional (3D) "voxel" representation of the scanned compartments that are reconstructed. The imaging device 110 uses multiple energy bands in CT scanners for enhanced materials discrimination, and can achieve real time scanning rates for compartments in airport baggage/parcel handling operations. Further, the imaging device 110 produces a series of image slices through the compartment, which can be reconstructed as a traditional CT 3D volume, akin to those encountered within medical CT imaging. The imagine device 110 is physically located at the security checkpoint to receive compartments fed on a conveyor belt, for example. Other methods to insert the compartments into the imaging device 110 can be used.

Figure 2:
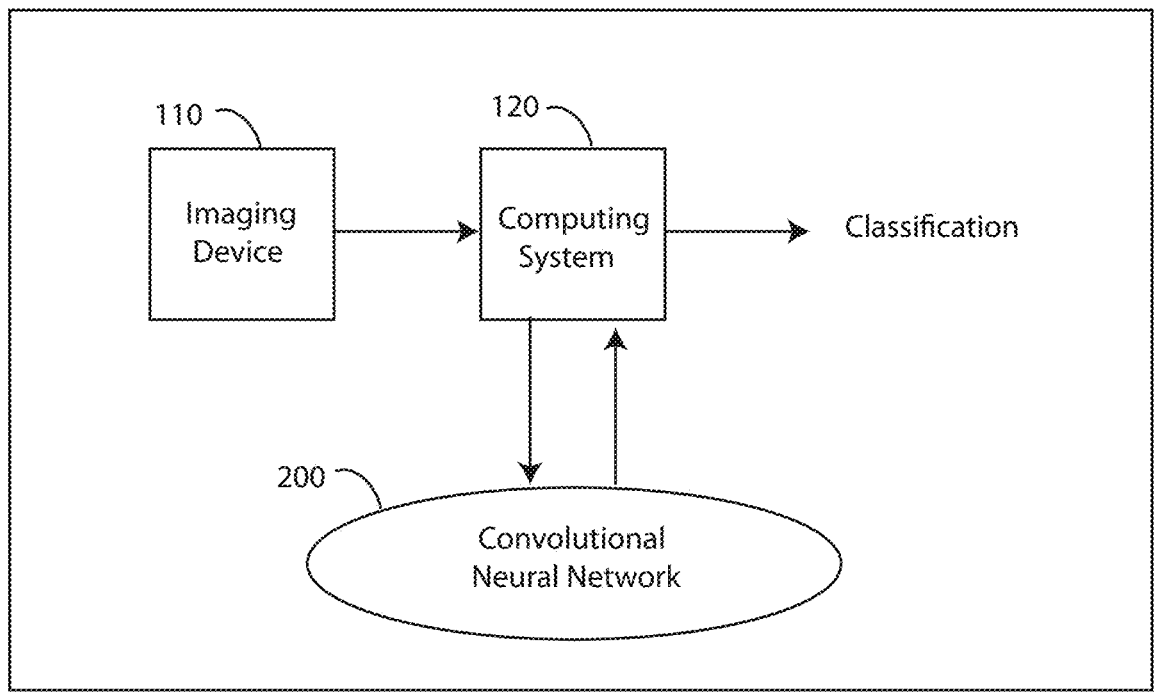
FIG. 2 depicts a block diagram of a screening procedure at a security checkpoint, in accordance with embodiments of the present invention.

FIG. 2 depicts a block diagram of a screening technique at a security checkpoint, in accordance with embodiments of the present invention. The screening technique includes the imaging device 110, the computing system 120, and a convolutional neural network (CNN) 200. The output of the screening technique is an automatic classification of a prohibited material inside a compartment. The classification can be categorized into two categories. The two categories are a first category that represents compartments that does not include a prohibited material based on an output of the neural network 200, and a second category that represents compartments that include a prohibited material based on the output of the neural network 200. For compartments classified into the second category, the classification system 100 can identify which prohibited material is located in the compartment based on the training data compiled by training the neural network 200. The screening technique of FIG. 2 leverages deep learning techniques, which have emerged as a powerful alternative for supervised learning with great model capacity and the ability to learn highly discriminative features. In particular, CNNs are used to analyze the outputs from the imaging device 110 to provide an immediate classification of a compartment as having a material that is a threat or not a threat. The network topology of CNNs exploits the stationary nature of natural images by learning features using locally connected networks. Convolutional layers are used to learn small feature detectors based on patches randomly sampled from a large image, resulting in powerful object representations without the need to hand design features.

The screening technique classifies the compartments scanned by the imaging device 110 automatically based on whether the compartments contains a specific material that is prohibited. For instance, the screening technique first scans the compartment with the imaging device 110 and then feeds the three-dimensional representation to a trained neural network 200 to output a classification of whether the scanned compartment contains a prohibited material or not. The automatic decision from the neural network 200 is quickly output from the neural network 200 and transmitted to the computing system 120. The computing system 120 can display a result on or more monitors visible to the security office and/or traveler.

Materials, such as powder and liquid, are often dynamic and malleable, therefore a shape-based approach to segmenting features would likely fail, resulting in reduced detection rates and increased false negatives. To address this issue, classification system 100 utilizes two voxel-based classification frameworks, namely a Tri-planar CNN and 3D Sub-Volume CNN. Each of these frameworks attempts to classify a center voxel of a given sub-volume within the scanned bag.

Referring back to FIG. 1, the computing system 120 of the classification system 100 is equipped with a memory device 142 which stores various data/information/code, and a processor 141 for implementing the tasks associated with the classification system 100. A classification application 130 is loaded in the memory device 142 of the computing system 120. The classification application 130 can be an interface, an application, a program, a module, or a combination of modules. In an exemplary embodiment, the classification application 130 is a software application running on one or more back end servers (e.g. computing system 120), servicing the imagine device 110 and potentially linked security-operated computing devices, as well as communicating with the neural network 200.

The classification application 130 of the computing system 120 includes a receiving module 131, a CNN training module 132, a classification module 133, and an alerting module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The receiving module 131 includes one or more components of hardware and/or software program code for receiving a three-dimensional representation of a compartment from an imaging device 110 connected to the computing system 120. For instance, the volume data generated by the imaging device 110 as a function of the scanning of a compartment is transmitted to the computing system 120 for analysis and classification. The receiving module 131 receives the 3D volume representation of the scanned compartment and prepares the data for feeding into a trained neural network, such as CNN 200 shown in FIG. 2. The volumetric representation is a set or series of images in sequence of the interior region of the compartment, output by the imaging device 110, such as a computed topography (CT) scanner. Each image in the set of images has a width and a height, and when stacked together, form a depth. In response to receiving the 3D volume representation data from the imaging device 110, the receiving module 131 transmits the 3D volume representation data to the trained neural network.

The CNN training module 132 includes one or more components of hardware and/or software program code for training and updating the neural network 200 so that the neural network 200 can detect a presence of a prohibited material within a scanned compartment and learn over time. The CNN training module 132 uses a multi-step procedure to train the neural network. Volume data for known prohibited materials are utilized by the CNN training module 132 to train the neural network. For example, the 3D volume representation data of a first known prohibited material is fed into the neural network 200. For instance, the CNN training module 132 trains and updates the neural network 200 by isolating a sub-volume around a voxel of a three-dimensional representation of a known prohibited material, for each voxel of the three-dimensional representation of the known prohibited material, extracting three central orthogonal planes inside the sub-volume, the three central orthogonal planes passing rough a center of the voxel, stacking the thee central orthogonal planes into a single, two-dimensional image, and then feeding the stacked two-dimensional image into the trained neural network so that the trained neural network learns that the single, two-dimensional image fed into the trained neural network 200 corresponds to a voxel classification of the known prohibited material. The process is repeated over time with the same prohibited material and with a second prohibited material, third prohibited material, and so on until the neural network 200 is trained and contains significant training data.

Figure 3:
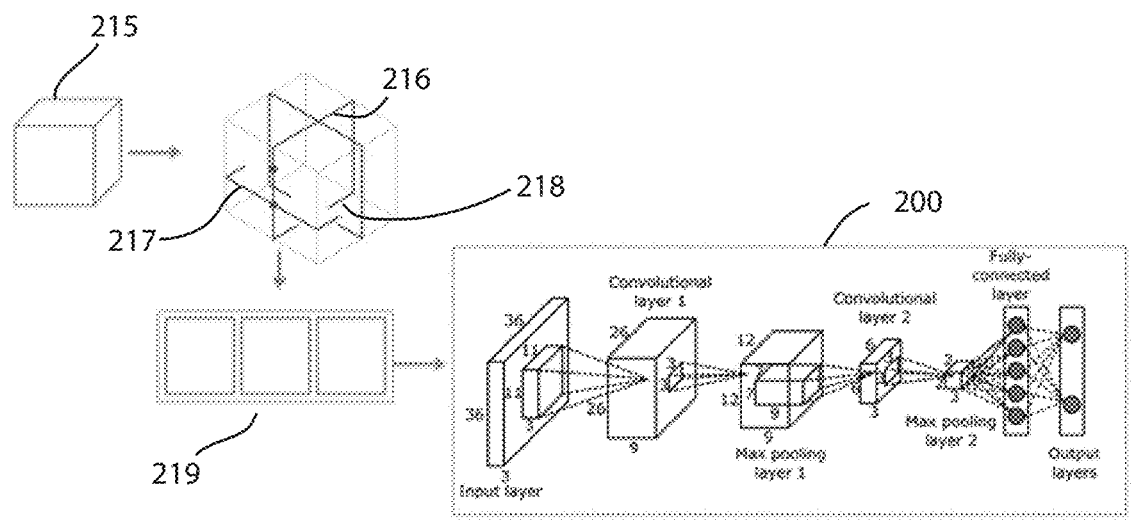
FIG. 3 depicts a first system overview of the training of a neural network, in accordance with embodiments of the present invention.

A more detailed description of the neural network 200 training will now be described with respect to FIG. 3, which depicts a first system overview of the training of a neural network 200, in accordance with embodiments of the present invention. The volume data is provided by the imaging device 110, which is comprised of a plurality of voxels (e.g. 3D pixels). For every voxel in the volume, the CNN training module 132 extracts a sub-volume 215 around the voxel. The size of the sub-volume 215 is n×n×n around the voxel (e.g. 3×3×3 or 5×5×5), and can be in the shape of a cube. Extracting the sub-volume 215 provides a context around the voxel. Central orthogonal planes are taken from the sub-volume 215 around the voxel. FIG. 3 depicts three central orthogonal planes being extracted from inside the sub-volume 215, in particular projection 216 along the X, Y plane, projection 217 along X, Z plane, and projection 218 along Y, Z plane. The voxel of interest is located at a center of the three central planes 216, 217, 218, which all pass through the center. The three planes 216, 217, 218 are stacked next to each other to form a 2D image 219. The stacked image 219 includes the first plane 216 next to the second plane 217 next to the third plane 218. The CNN training module 132 then uses the stacked images 219 to train the neural network 200 by passing the stacked images 219 through the neural network 200 and obtaining the training data. The neural network 200 includes an input layer, a first convolutional layer, a first max pooling layer, a second convolutional layer, a second max pooling layer, a fully connected layer, and an output layer. In an exemplary embodiment, the neural network 200 is a two-dimensional CNN, and more particularly a triplanar convolution network (TCN). As an extension to the tri-planar approach, each sub-volume of size $x^3$ can be used to extract orthogonal slices in each direction. These slices (planes) are then stacked onto a larger, more informative image.

In an exemplary embodiment, example data set for training and validation of the neural network 200 is created by sampling all threat voxels across every CT volume for a specific threat to form 50% of the samples. Non-threat voxels are sampled from a threshold range to form 45% of the samples. The thresholds were computed by computing a mean of all threat voxels for a specific threat and subtracting 3.5 standard deviations from the mean for the low threshold and adding 3.5 standard deviations from the mean for the high threshold. The last 5% of the samples were randomly sampled from any non-threat voxel in the CT volume. Finally, 80% of the samples are used for training and 20% of the examples were used for validation. For testing, a threshold surrounding the volume is formed (e.g. ±3.5 standard deviations from the mean as above) and tested across all voxels in the threshold range for every volume of every specified threat.

In an alternative embodiment, the CNN training module 132 a variation of the multi-step procedure described above to train a neural network 201. For instance, to explicitly capture spatial relationships in a three-dimensional context, 3D convolution on the sub-volumes of different sizes is applied. Volume data for known prohibited materials are utilized by the CNN training module 132 to train the neural network 201. For example, the 3D volume representation data of a first known prohibited material is fed into the neural network 201. For instance, the CNN training module 132 trains and updates the neural network 201 by isolating sub-volumes of different sizes around a voxel of a three-dimensional representation of a known prohibited material, for each voxel of the three-dimensional representation of the known prohibited material, applying three-dimensional convolutions on the sub-volumes of different sizes, and feeding the three-dimensional convolutions into the neural network 201 so that the neural network 201 learns that the convoluted sub-volumes fed into the neural network 201 corresponds to a voxel classification of the known prohibited material. The process is repeated over time with the same prohibited material and with a second prohibited material, third prohibited material, and so on until the neural network 200 is trained and contains significant training data.

Figure 4:
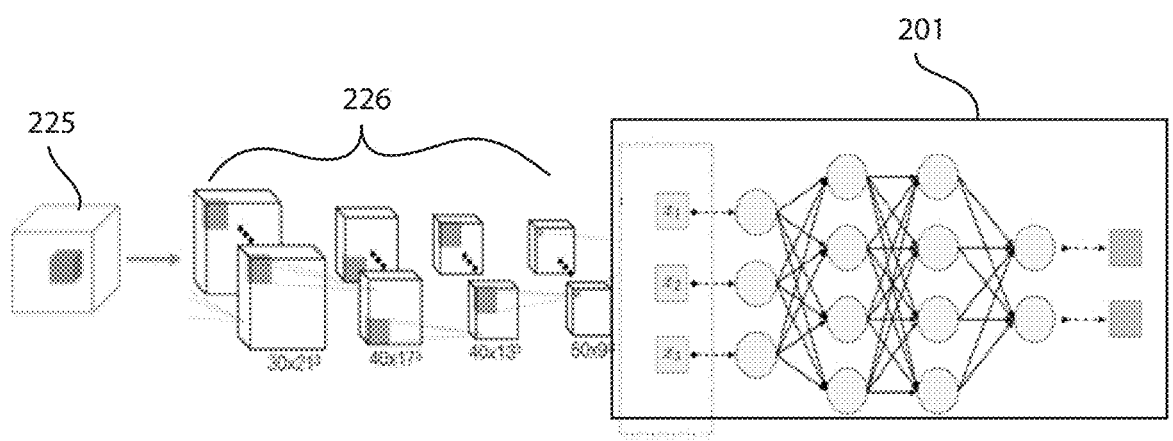
FIG. 4 depicts a second system overview of the training of a neural network, in accordance with embodiments of the present invention.

A more detailed description of the neural network 201 training will now be described with respect to FIG. 4, which depicts a second system overview of the training of a neural network 201, in accordance with embodiments of the present invention. The volume data is provided by the imaging device 110, which is comprised of a plurality of voxels (e.g. 3D pixels). For every voxel in the volume, the CNN training module 132 extracts a sub-volume 225 around the voxel. The size of the sub-volume 225 is n×n×n around the voxel (e.g. 3×3×3 or 5×5×5), or n×m×k (e.g. 3×5×7), and can be in the shape of a cube, and can be many different sizes of cubes. Extracting the sub-volume 225 provides a context around the voxel. Instead of extracting central orthogonal planes from the sub-volume 225 around the voxel, the CNN training module 132 passes the entire sub-volume 225 though neural network 201, which is a three-dimensional convolutional neural network. All of the layers and the filters 226 of the neural network 201 are three-dimensional. The CNN training module 132 applies three-dimensional convolutions on the sub-volumes, and feeds the sub-volume 225 to the neural network 201. The neural network 201 includes an input layer, a first convolutional layer, a first max pooling layer, a second convolutional layer, a second max pooling layer, a fully connected layer, and an output layer. The neural network 201 can include more than three layers. In an exemplary embodiment, the neural network 201 is a three-dimensional CNN referred to as a sub-volume classification network (SCN).

Referring back to FIG. 1, the classification module 133 includes one or more components of hardware and/or software program code for classifying each voxel of the three-dimensional representation of the compartment being scanned using a trained neural network to determine whether any voxel classifications of the three-dimensional representation correspond to a voxel classification of a prohibited material. For instance, the classification module 133 isolates a sub-volume around each voxel of the three-dimensional representation of the scanned compartment received from the imaging device 110 and either feeds a stacked image 219 of central orthogonal planes 216, 217, 218 from inside the sub-volume 215 to the trained neural network 200 or feeds the entire sub-volume 225 to the neural network 201. Because the neural network 200, 201 has been trained using volume data from known prohibited materials, the classification module 133 leverages the neural network 200, 201 to determine automatically whether the scanned compartment includes volume data known to correspond with prohibited materials for immediate categorization and screening. The classification module 133 labels the data based on the training data comprised by the neural network 200, 201 so that the computing system 120 can determine that the compartment does or does not contain a prohibited material, and which material the compartment contains. The label may be threat or no threat, or may be further detailed such as label data of a particular material or combination of materials. In an exemplary embodiment, the classification module 133 detects whether or not the compartment contains a prohibited material within the compartment, and exactly what type of prohibited object is located within the compartment.

By way of example, the trained neural network 200, 201 automatically detects that the compartment contains the prohibited material in response to a determination that at least one voxel classification of the three-dimensional representation corresponds to the voxel classification of the known prohibited material. Conversely, the trained neural network 200, 201 automatically detects that the compartment does not contain the prohibited material in response to a determination that none of the voxel classifications of the three-dimensional representation correspond to the voxel classification of the known prohibited material. Accordingly, compartments classified as not having prohibited material may be automatically cleared at the security checkpoint and compartments classified as having a prohibited material undergo further security checks, thereby streamlining a screening process at a security checkpoint.

Figure 5:
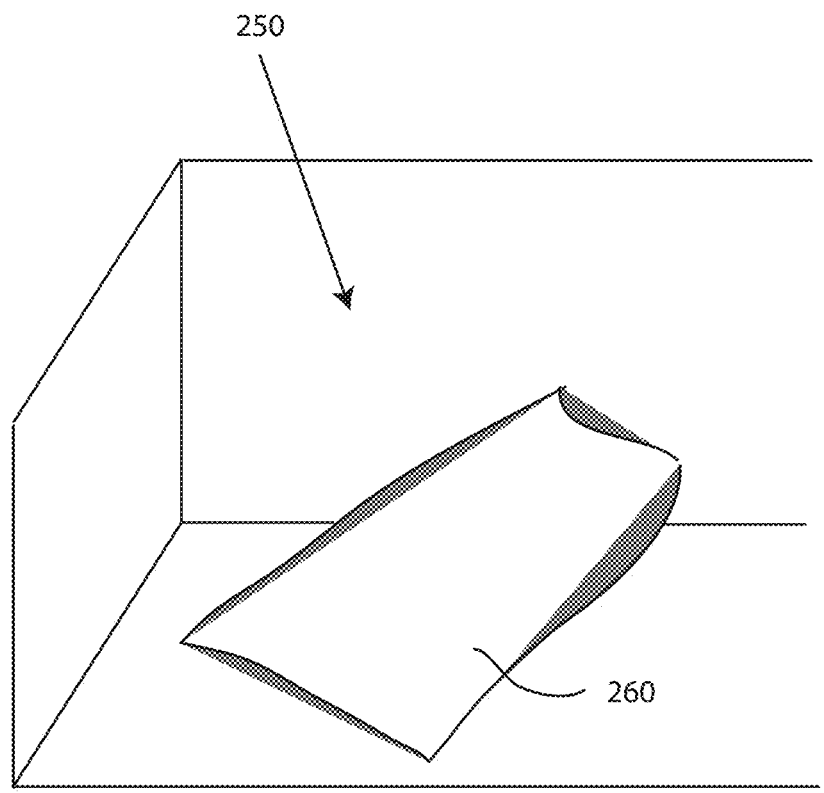
FIG. 5 depicts a schematic view of a rendering of labeled voxels to visualize a location of the prohibited material in the compartment, in accordance with embodiments of the present invention.

The classification module 133 optionally labels each of the voxels determined to have a same voxel classification as a known prohibited material and generates a three-dimensional rendering of the labeled voxels to visualize a location of the prohibited material within the compartment. FIG. 5 depicts a schematic view of a rendering 260 of labeled voxels to visualize a location of the prohibited material in the compartment, in accordance with embodiments of the present invention. When the classification module 133 classifies each voxel of the volume representation, the voxel is labeled with material classification data. The rendering 260 shows that the material has a sheet-like shape, but the shape is not what the classification system 100 is characterizing for automatic detection of prohibited objects within compartments. Because the material could have many different shapes, the classification system 100 classifies voxels of volume data from materials. Nevertheless, the classification module 133 can generate a rendering 260 in space to assist a security officer to make decisions.

The alerting module 134 includes one or more components of hardware and/or software program code for alerting or otherwise displaying the classification determination made by the computing system 120. The classification may be output to one or more computing devices operated by the security officers and/or computers or monitors located at the security checkpoint. The alert or notification to the security offer is optionally discrete.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the classification system 100 improves security technology by increasing the visibility of compartments being scanned by imaging devices and providing automated determinations of whether a piece of luggage contains a prohibited material. Deep learning and CNNs provide image recognition automation to solve a particular important and technical problem of quickly detecting a presence of a prohibited material inside a compartment. The classification system 100 provides a technical solution by classifying 3D volumetric representations of compartments scanned at a security checkpoint into two categories, based on the material type contained within the compartment, without relying on manual visual inspection.

Figure 6:
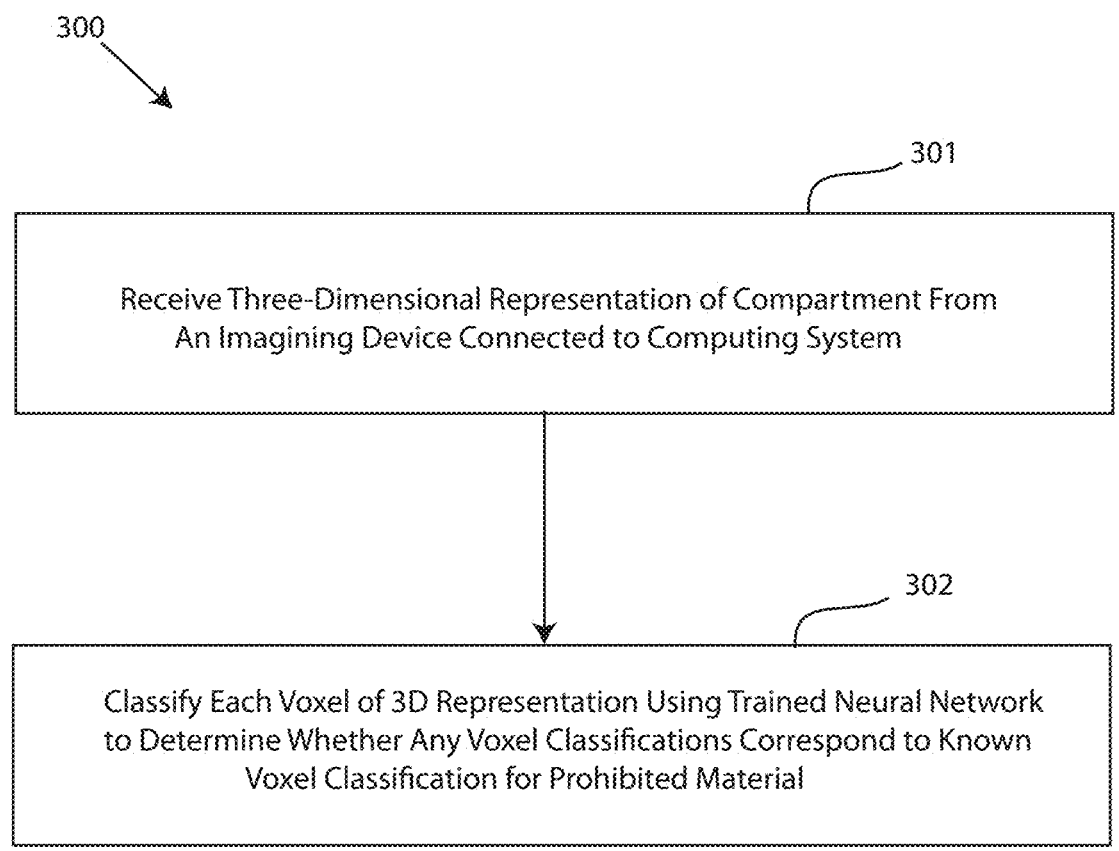
FIG. 6 depicts a flow chart of a method for automatically detecting prohibited materials in a compartment at a security checkpoint, in accordance with embodiments of the present invention.

Referring now to FIG. 6, which depicts a flow chart of a method 300 for automatically detecting prohibited materials in a compartment at a security checkpoint, in accordance with embodiments of the present invention. One embodiment of a method 300 or algorithm that may be implemented for automatically detecting prohibited materials in a compartment at a security checkpoint with the classification system 100 described in FIGS. 1-5 using one or more computer systems as defined generically in FIG. 9 below, and more specifically by the specific embodiments of FIG. 1.

Embodiments of the method 300 for automatically detecting prohibited materials in a compartment at a security checkpoint, in accordance with embodiments of the present invention, may begin at step 301 wherein step 301 receives a three-dimensional representation of a scanned compartment from an imaging device connected to the computing system. Step 302 classifies each voxel of the three-dimensional representation using a trained neural network to determine whether any voxel classifications correspond to known voxel classifications for prohibited materials.

Figure 7:
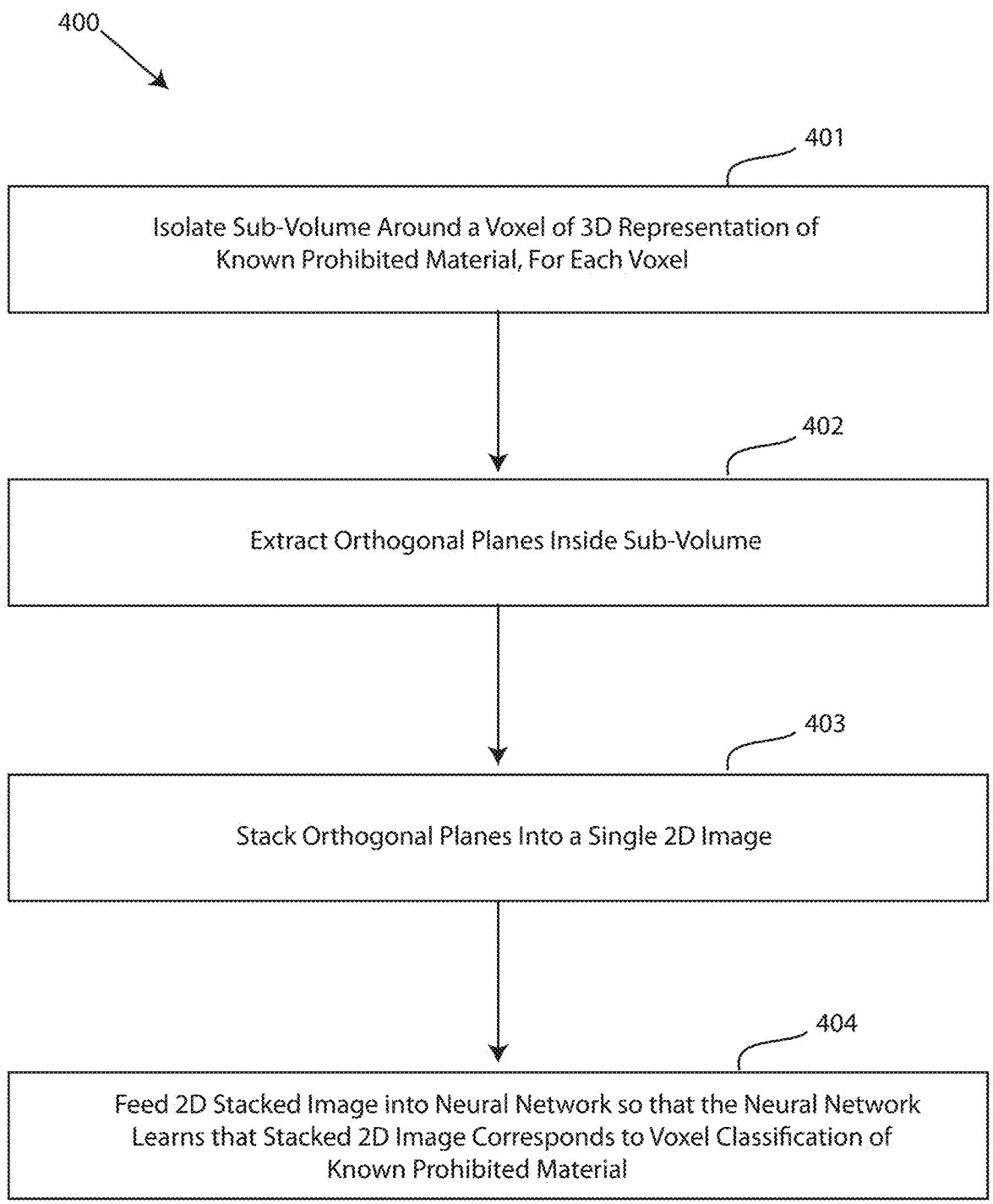
FIG. 7 depicts a flow chart for training a first neural network, in accordance with embodiments of the present invention.

FIG. 7 depicts a flow chart of a method 400 for training a first neural network, in accordance with embodiments of the present invention. Step 401 isolates a sub-volume around each voxel of a three-dimensional representation of the known prohibited material, for each voxel. Step 402 extracts orthogonal planes inside the sub-volume. Step 403 stacks the orthogonal planes into a stacked two-dimensional image. Step 404 feeds the stacked two-dimensional image into the neural network so that the neural network learns that the stacked two-dimensional image corresponds to a voxel classification of known prohibited materials.

Figure 8:
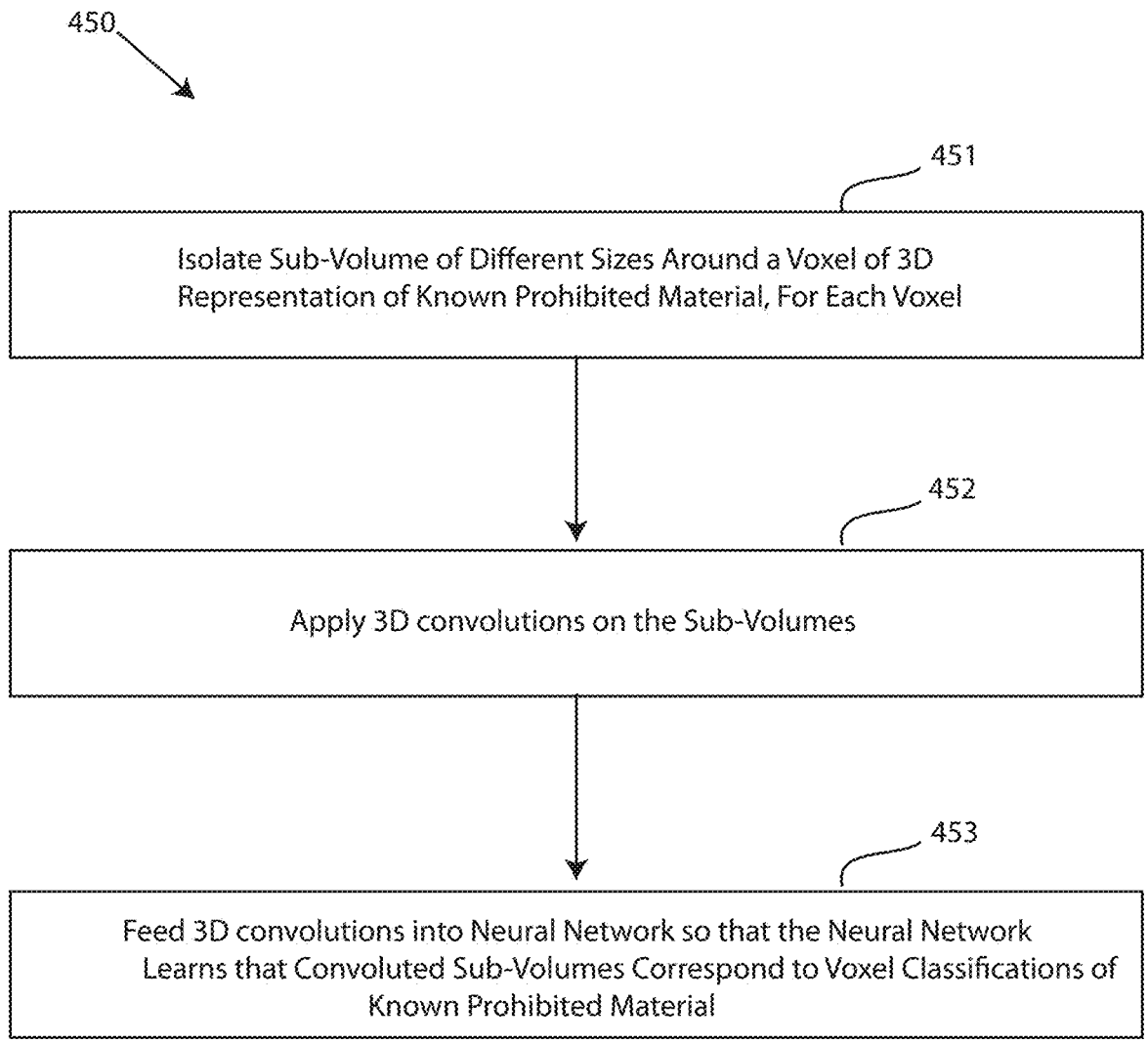
FIG. 8 depicts a flow chart for training a second neural network, in accordance with embodiments of the present invention.

FIG. 8 depicts a flow chart of a method 450 for training a second neural network, in accordance with embodiments of the present invention. Step 451 isolates a sub-volume of different sizes around a voxel of a three-dimensional representation of known prohibited materials, for each voxel. Step 452 applies three-dimensional convolutions on the sub-volumes. Step 453 feeds the three-dimensional convolutions into the neural network so that the neural network learns that the convoluted sub-volumes correspond to voxel classifications of known prohibited materials.

Figure 9:
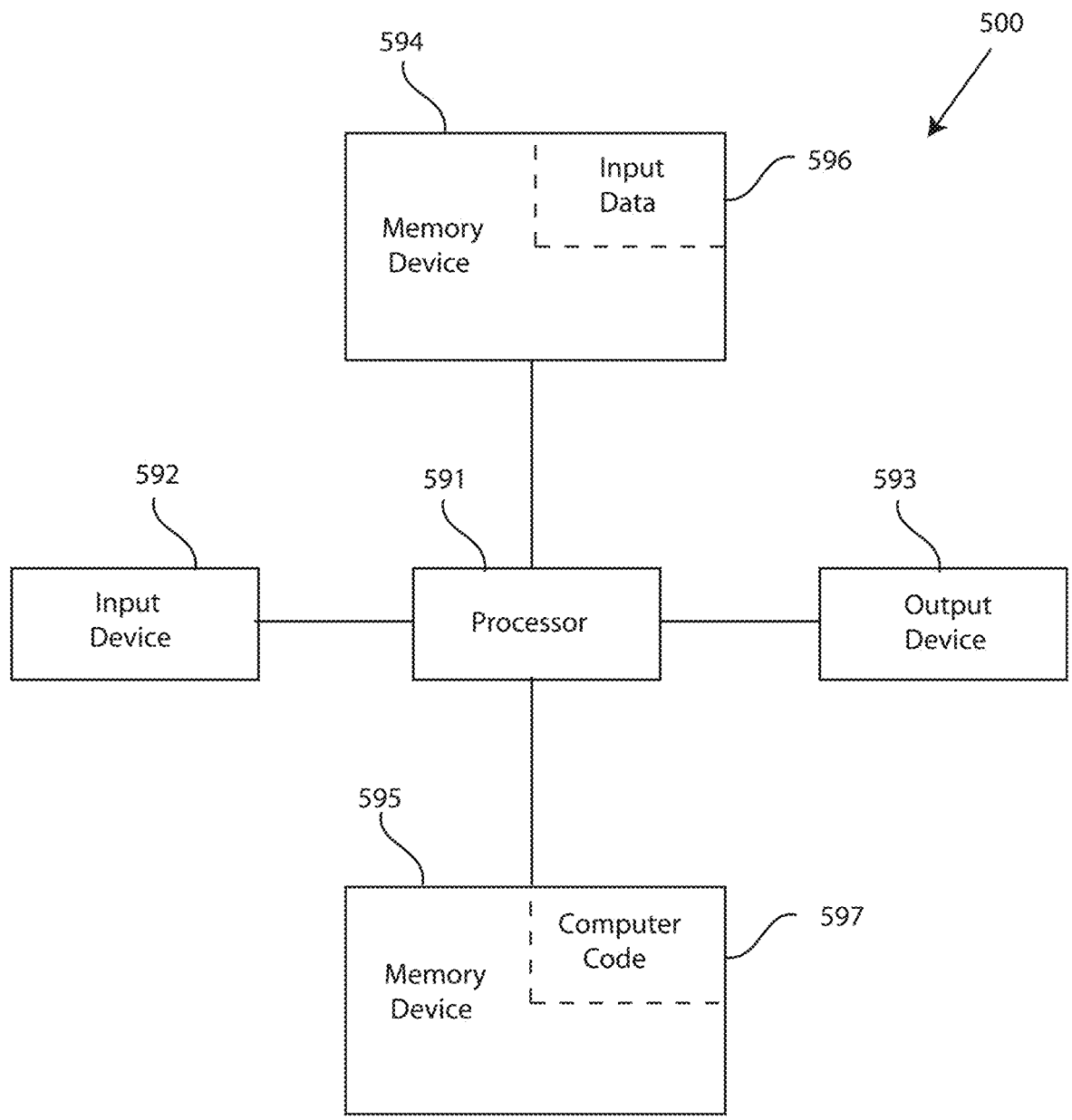
FIG. 9 depicts a block diagram of a computer system for classification system of FIGS. 1-5, capable of implementing a method for automatically detecting prohibited materials in a compartment at a security checkpoint of FIGS. 6-8, in accordance with embodiments of the present invention.
Figure 10:
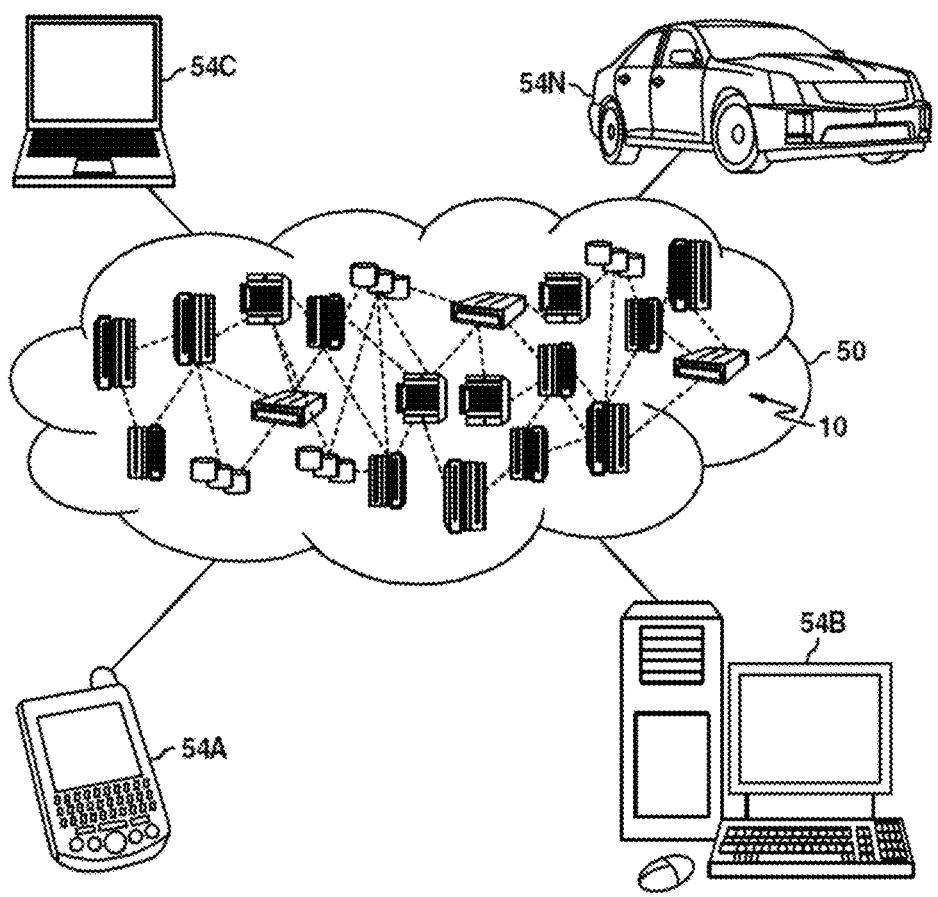
FIG. 10 depicts a cloud computing environment, in accordance with embodiments of the present invention.
Figure 11:
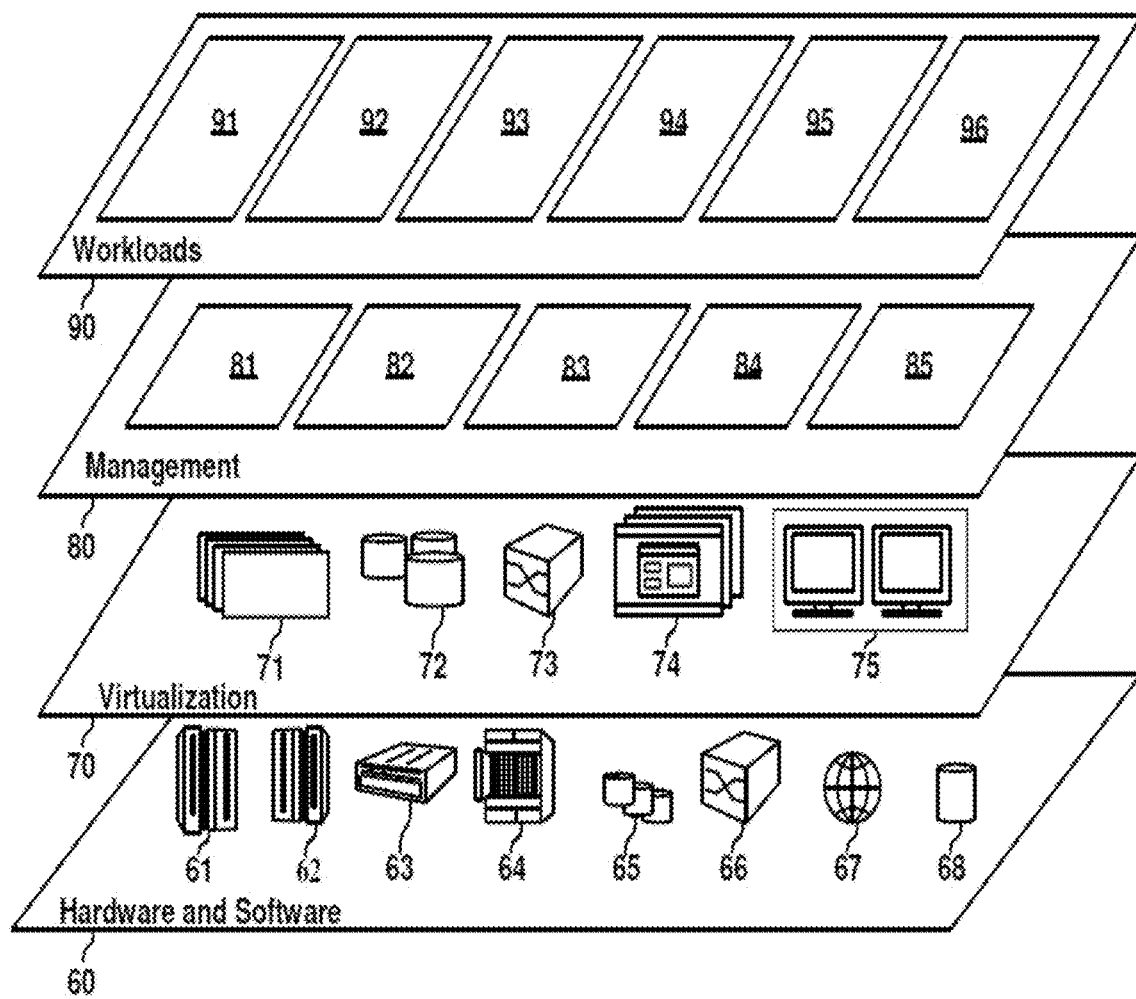
FIG. 11 depicts abstraction model layers, in accordance with embodiments of the present invention.

FIG. 9 depicts a block diagram of a computer system for the classification system 100 of FIGS. 1-5, capable of implementing methods for automatically detecting prohibited materials in a compartment at a security checkpoint of FIGS. 6-8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for automatically detecting prohibited materials in a compartment at a security checkpoint in the manner prescribed by the embodiments of FIGS. 6-8 using the classification system 100 of FIGS. 1-5, wherein the instructions of the computer code 597 may be executed by processor 591 via memory device 595. The computer code 597 may include software or program instructions that may implement one or more algorithms for implementing the method for automatically detecting prohibited materials in a compartment at a security checkpoint, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 9.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to automatically classifying compartments at a security checkpoint. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to automatically classify compartments at a security checkpoint. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a for using augmented reality for assisting speech development of multiple languages. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for automatically classifying compartments at a security checkpoint.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (see FIG. 8) are shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and classification 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically detecting prohibited materials in a compartment at a security checkpoint, comprising:
   receiving, by a processor of a computing system, a three-dimensional representation of a compartment from an imaging device connected to the computing system; and
   classifying, by the processor, each voxel of the three-dimensional representation using a trained neural network to determine whether any voxel classifications of the three-dimensional representation correspond to a voxel classification of a prohibited material;
   wherein the trained neural network is trained by:
      isolating, by the processor, a sub-volume around a voxel of a three-dimensional representation of a known prohibited material, for each voxel of the three-dimensional representation of the known prohibited material;
      extracting, by the processor, three central orthogonal planes inside the sub-volume, the three central orthogonal planes passing through a center of the voxel;
      stacking, by the processor, the three central orthogonal planes into a single, two-dimensional image; and
      feeding, by the processor, the single two-dimensional image into the trained neural network so that the trained neural network learns that the single, two-dimensional image fed into the trained neural network corresponds to a voxel classification of the known prohibited material.

2. The method of claim 1, wherein the three-dimensional representation is a set of images in sequence of an interior region of the compartment, output by a computed topography (CT) scanner, further wherein each image in the set of images has a width and a height, and when stacked together, form a depth.

3. The method of claim 1, wherein the trained neural network automatically detects that the compartment contains the prohibited material in response to a determination that at least one voxel classification of the three-dimensional representation corresponds to the voxel classification of the known prohibited material.

4. The method of claim 1, wherein the trained neural network automatically detects that the compartment does not contain the prohibited material in response to a determination that none of the voxel classifications of the three-dimensional representation correspond to the voxel classification of the known prohibited material.

5. The method of claim 4, wherein the trained neural network is a two-dimensional convolutional neural network (CNN) that detects a presence of the prohibited material in the compartment based on a voxel classification of the three-dimensional representation, without requiring human inspection of an output of the imaging device.

6. The method of claim 5, wherein the two-dimensional CNN is a tri-planar convolutional neural network (TCN).

7. The method of claim 1, wherein the prohibited material is malleable such that the prohibited material has no consistent shape to base a classification on to detect a presence of the prohibited material inside the compartment.

8. The method of claim 1, further comprising:
labeling, by the processor, each of the voxels determined to have a same voxel classification as a known prohibited material; and
generating, by the processor, a three-dimensional rendering of the labeled voxels to visualize a location of the prohibited material within the compartment.

9. A computing system, comprising:
a processor;
a memory device coupled to the processor; and
a computer readable storage device coupled to the processor, wherein the storage device contains program code executable by the processor via the memory device to implement a method for automatically detecting prohibited materials in a compartment at a security checkpoint comprising:
receiving, by a processor of a computing system, a three-dimensional representation of a compartment from an imaging device connected to the computing system; and
classifying, by the processor, each voxel of the three-dimensional representation using a trained neural network to determine whether any voxel classifications of the three-dimensional representation correspond to a voxel classification of a prohibited material;
wherein the trained neural network is trained by:
isolating, by the processor, a sub-volume around a voxel of a three-dimensional representation of a known prohibited material, for each voxel of the three-dimensional representation of the known prohibited material;
extracting, by the processor, three central orthogonal planes inside the sub-volume, the three central orthogonal planes passing through a center of the voxel;
stacking, by the processor, the three central orthogonal planes into a single, two-dimensional image; and
feeding, by the processor, the single two-dimensional image into the trained neural network so that the trained neural network learns that the single, two-dimensional image fed into the trained neural network corresponds to a voxel classification of the known prohibited material.

10. The computing system of claim 9, wherein the trained neural network automatically detects that the compartment contains the prohibited material in response to a determination that at least one voxel classification of the three-dimensional representation corresponds to the voxel classification of the known prohibited material, and the trained neural network automatically detects that the compartment does not contain the prohibited material in response to a determination that none of the voxel classifications of the three-dimensional representation correspond to the voxel classification of the known prohibited material.

11. A computer program product, comprising a computer readable hardware storage device storing a computer readable program code, the computer readable program code comprising an algorithm that when executed by a computer processor of a computing system implements a method for automatically detecting prohibited materials in a compartment at a security checkpoint comprising:
receiving, by a processor of a computing system, a three-dimensional representation of a compartment from an imaging device connected to the computing system; and
classifying, by the processor, each voxel of the three-dimensional representation using a trained neural network to determine whether any voxel classifications of the three-dimensional representation correspond to a voxel classification of a prohibited material;
wherein the trained neural network is trained by:
isolating, by the processor, a sub-volume around a voxel of a three-dimensional representation of a known prohibited material, for each voxel of the three-dimensional representation of the known prohibited material;
extracting, by the processor, three central orthogonal planes inside the sub-volume, the three central orthogonal planes passing through a center of the voxel;
stacking, by the processor, the three central orthogonal planes into a single, two-dimensional image; and
feeding, by the processor, the single two-dimensional image into the trained neural network so that the trained neural network learns that the single, two-dimensional image fed into the trained neural network corresponds to a voxel classification of the known prohibited material.

12. The computer program product of claim 11, wherein the trained neural network automatically detects that the compartment contains the prohibited material in response to a determination that at least one voxel classification of the three-dimensional representation corresponds to the voxel classification of the known prohibited material, and the trained neural network automatically detects that the compartment does not contain the prohibited material in response to a determination that none of the voxel classifications of the three-dimensional representation correspond to the voxel classification of the known prohibited material.

* * * * *